(12) United States Patent
Shin et al.

(10) Patent No.: US 12,455,376 B2
(45) Date of Patent: *Oct. 28, 2025

(54) LIDAR APPARATUS USING INTERRUPTED CONTINUOUS WAVE LIGHT

(71) Applicant: SAMSUNG ELECTRONICS CO., LTD., Suwon-si (KR)

(72) Inventors: Dongjae Shin, Seoul (KR); Hyunil Byun, Seongnam-si (KR); Changgyun Shin, Anyang-si (KR); Bongyong Jang, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 1 day.

This patent is subject to a terminal disclaimer.

(21) Appl. No.: 18/435,085

(22) Filed: Feb. 7, 2024

(65) Prior Publication Data

US 2024/0411024 A1    Dec. 12, 2024

Related U.S. Application Data

(63) Continuation of application No. 17/976,190, filed on Oct. 28, 2022, now Pat. No. 11,927,670, which is a
(Continued)

(30) Foreign Application Priority Data

Dec. 10, 2019 (KR) ............ 10-2019-0164143

(51) Int. Cl.
*G01S 17/42* (2006.01)
*G01S 7/4865* (2020.01)
(Continued)

(52) U.S. Cl.
CPC ............ *G01S 17/42* (2013.01); *G01S 7/4865* (2013.01); *G01S 17/26* (2020.01); *G01S 17/931* (2020.01)

(58) Field of Classification Search
None
See application file for complete search history.

(56) References Cited

U.S. PATENT DOCUMENTS 3,619,058 A    11/1971    Hewlett
4,846,571 A    7/1989    Jelalian et al.
(Continued)

FOREIGN PATENT DOCUMENTS

CN    109219761 A    1/2019
CN    110114632 A    8/2019
(Continued)

OTHER PUBLICATIONS

Communication dated Nov. 9, 2020 issued by the European Patent Office in application No. 20174146.9.
(Continued)

*Primary Examiner* — Bernarr E Gregory
(74) *Attorney, Agent, or Firm* — Sughrue Mion, PLLC

(57) ABSTRACT

A light detection and ranging (LiDAR) apparatus capable of extracting speed information and distance information of objects in front thereof is provided. The LiDAR apparatus includes: a continuous wave light source configured to generate continuous wave light; a beam steering device configured to emit the continuous wave light to an object for a first time and stop emitting the continuous wave light to the object for a second time; a receiver configured to receive the continuous wave light that is reflected from the object to form a reception signal; and a signal processor configured to obtain distance information and speed information about the object based on the reception signal.

10 Claims, 12 Drawing Sheets

Related U.S. Application Data continuation of application No. 16/886,180, filed on May 28, 2020, now Pat. No. 11,513,226.

(51) Int. Cl.
*G01S 17/26* (2020.01)
*G01S 17/931* (2020.01)

(56) References Cited

U.S. PATENT DOCUMENTS

| | | | |
|---|---|---|---|
| 5,673,050 A | 9/1997 | Moussally et al. | |
| 6,018,309 A | 1/2000 | Mitsumoto et al. | |
| 7,864,106 B2 | 1/2011 | Beilin et al. | |
| 10,571,570 B1 | 2/2020 | Paulsen et al. | |
| 11,513,226 B2 | 11/2022 | Shin et al. | |
| 11,927,670 B2 * | 3/2024 | Shin | G01S 7/4917 |
| 2004/0145723 A1 | 7/2004 | Ohtomo et al. | |
| 2009/0046271 A1 | 2/2009 | Constantikes | |
| 2013/0044309 A1 * | 2/2013 | Dakin | G01S 17/89 356/4.09 |
| 2015/0153447 A1 | 6/2015 | Lee et al. | |
| 2016/0363659 A1 | 12/2016 | Mindell et al. | |
| 2017/0082735 A1 * | 3/2017 | Slobodyanyuk | G01S 17/931 |
| 2017/0184450 A1 | 6/2017 | Doylend et al. | |
| 2017/0201059 A1 | 7/2017 | Villeneuve et al. | |
| 2017/0350964 A1 | 12/2017 | Kaneda | |
| 2017/0356983 A1 * | 12/2017 | Jeong | G01S 7/4817 |
| 2018/0188371 A1 * | 7/2018 | Bao | G01S 17/931 |
| 2019/0011558 A1 * | 1/2019 | Crouch | G01S 17/931 |
| 2019/0018144 A1 | 1/2019 | Imaki et al. | |
| 2019/0049573 A1 | 2/2019 | Cho et al. | |
| 2019/0079165 A1 | 3/2019 | Retterath et al. | |
| 2019/0154810 A1 | 5/2019 | Tanemura et al. | |
| 2019/0154835 A1 | 5/2019 | Maleki et al. | |
| 2019/0302269 A1 | 10/2019 | Singer et al. | |
| 2019/0310371 A1 | 10/2019 | Kyselov | |
| 2019/0310372 A1 | 10/2019 | Crouch et al. | |
| 2019/0331797 A1 | 10/2019 | Singer et al. | |

FOREIGN PATENT DOCUMENTS

| | | |
|---|---|---|
| EP | 1 777 549 A1 | 4/2007 |
| JP | 2019-95218 A | 6/2019 |
| KR | 10-2015-0063639 A | 6/2015 |
| KR | 10-2019-0089724 A | 7/2019 |
| KR | 10-2019-0093603 A | 8/2019 |
| WO | 2017210000 A1 | 12/2017 |
| WO | 2018160240 A2 | 9/2018 |

OTHER PUBLICATIONS

Communication issued Feb. 27, 2025 by the China National Intellectual Property Administration in Chinese Patent Application No. 202010497342.4.

Communication issued Apr. 19, 2025 by the Korean Intellectual Property Office in Korean Patent Application No. 10-2019-0164143.

* cited by examiner

LIDAR APPARATUS USING INTERRUPTED CONTINUOUS WAVE LIGHT

CROSS-REFERENCE TO RELATED APPLICATION

This application is a continuation application of U.S. application Ser. No. 17/976,190, filed Oct. 28, 2022, now U.S. Pat. No. 11,927,670, which is a continuation application of U.S. application Ser. No. 16/886,180, filed May 28, 2022, now U.S. Pat. No. 11,513,226 issued Nov. 29, 2022, which claims priority to Republic of Korea Patent Application No. 10-2019-0164143, filed on Dec. 10, 2019, in the Korean Intellectual Property Office of the Republic of Korea, the disclosures of which are incorporated herein by reference in their entireties.

BACKGROUND

1. Field

Apparatuses and methods consistent with example embodiments relate to light detection and ranging (LiDAR) apparatuses, and more particularly, to LiDAR apparatuses capable of extracting speed information and distance information of objects in front thereof by using interrupted continuous wave light.

2. Description of Related Art

Recently, an advanced driving assistance system (ADAS) with various functions has been commercialized. For example, there is an increasing number of vehicles equipped with functions such as adaptive cruise control (ACC) or autonomous emergency braking system (AEB). The ACC is a function of recognizing the position and speed of another vehicle to reduce the speed when there is a risk of collision and to drive a vehicle within a set speed range when there is no risk of collision. The AEB is a system that prevents a collision by automatically braking when there is a risk of collision by recognizing a vehicle ahead, but the driver does not respond to it or a response method is inappropriate. In addition, it is expected that automobiles capable of autonomous driving will be commercialized in the near future.

Accordingly, the importance of vehicle radar for providing front information of a vehicle is gradually increasing. For example, LiDAR sensors are commonly used as vehicle radars to measure the distance, velocity, azimuth position, etc. of a measurement target from a time when a scattered or reflected laser is returned after firing a laser, a laser intensity change, a laser frequency change, a polarization state change of the laser, or the like.

LIDAR sensors are classified into time of flight (ToF)-type sensors using pulses and frequency modulated continuous wave (FMCW)-type sensors using continuous wave light. In the case of the ToF type-sensors using pulses, a wideband receiver may be needed because the pulses include a wide frequency band. This makes noise suppression difficult. On the other hand, in the case of the FMCW type-sensors using continuous wave light, although noise may be suppressed using a narrowband receiver, the FMCW type-sensors may use a high power continuous wave light source, which is difficult to implement and expensive.

SUMMARY

Example embodiments address at least the above problems and/or disadvantages and other disadvantages not described above. Also, the example embodiments are not required to overcome the disadvantages described above, and may not overcome any of the problems described above.

One or more example embodiments provide light detection and ranging (LiDAR) apparatuses capable of extracting the speed information and distance information of objects in front thereof by using interrupted continuous wave light.

Further, one or more example embodiments provide LiDAR apparatuses capable of suppressing noise by using a narrowband receiver and capable of using a low cost low power continuous wave light source.

According to an aspect of an example embodiment, there is provided a light detection and ranging (LiDAR) apparatus including: a continuous wave light source configured to generate continuous wave light; a beam steering device configured to emit the continuous wave light to an object for a first time and stop emitting the continuous wave light to the object for a second time; a receiver configured to receive the continuous wave light that is reflected from the object to form a reception signal; and a signal processor configured to obtain distance information and speed information about the object based on the reception signal.

The beam steering device may be further configured to periodically repeat an operation of emitting the continuous wave light for the first time and an operation of stopping emitting the continuous wave light for the second time.

The second time may be greater than the first time.

The first time may be in a range of 1 ns to 1,000 ns.

The LiDAR apparatus may include: a beam splitter configured to provide a first portion of the continuous wave light generated by the continuous wave light source to the beam steering device so that the first portion of the continuous wave light is emitted to and reflected from the object, and then received by the receiver, and provide a second portion of the continuous wave light to the receiver, wherein the receiver may be further configured to form the reception signal by combining the first portion of the continuous wave light received by the receiver, and the second portion of the continuous wave light provided from the beam splitter, and causing the first portion and the second portion of the continuous wave light to interfere with each other.

The LiDAR apparatus may further include: an optical amplifier configured to amplify the continuous wave light generated by the continuous wave light source and provide the amplified continuous wave light to the beam steering device for the first time, and stop amplifying and outputting the continuous wave light for the second time.

The beam steering device may be further configured to emit the continuous wave light multiple times toward a first area in front of the beam steering device and then emit the continuous wave light multiple times toward a second area different from the first area.

The signal processor may be further configured to: accumulate a plurality of first reception signals received from the first area and obtain distance information and speed information about a first object in the first area based on the accumulated plurality of first reception signals; and accumulate a plurality of second reception signals received from the second area and obtain distance information and speed information about a second object in the second area based on the accumulated plurality of second reception signals.

The LiDAR apparatus may further include: a frequency modulator configured to drive the continuous wave light source such that the continuous wave light source generates frequency-modulated continuous wave light, wherein the beam steering device may be further configured to emit the frequency-modulated continuous wave light to the object for the first time and stop emitting the frequency-modulated continuous wave light to the object for the second time.

The signal processor may be further configured to obtain the distance information and the speed information about the object by analyzing a frequency of the reception signal in a frequency-modulated continuous wave (FMCW) manner.

The frequency modulator may be configured to linearly increase a frequency of the frequency-modulated continuous wave light for a third time.

The third time may be equal to a sum of the first time and the second time, and the beam steering device is further configured to emit the frequency-modulated continuous wave light once for the third time.

The third time may be greater than a sum of the first time and the second time, and the beam steering device is further configured to emit the frequency-modulated continuous wave light multiple times for the third time.

The frequency modulator may be further configured to linearly increase a frequency of the frequency-modulated continuous wave light for a third time and linearly decrease the frequency for a fourth time, wherein the third time for increasing the frequency of the frequency-modulated continuous wave light and the fourth time for decreasing the frequency of the frequency-modulated continuous wave light may be periodically repeated.

Each of the third time and the fourth time may be equal to a sum of the first time and the second time, and the beam steering device may be further configured to emit the frequency-modulated continuous wave light once for the third time and emit the frequency-modulated continuous wave light once for the fourth time.

Each of the third time and the fourth time may be greater than a sum of the first time and the second time, and the beam steering device may be configured to emit the frequency-modulated continuous wave light multiple times for the third time and emit the frequency-modulated continuous wave light multiple times for the fourth time.

The signal processor may be further configured to obtain the distance information and the speed information about the object in an FMCW manner based on the reception signal obtained from reflected light of the frequency-modulated continuous wave light emitted for the third time and the reception signal obtained from reflected light of the frequency-modulated continuous wave light emitted for the fourth time.

The signal processor may be further configured to obtain the distance information about the object by analyzing a waveform of the reception signal in a time of flight (ToF) manner.

The signal processor may be further configured to adjust the distance information about the object based on the distance information extracted in the ToF manner and the distance information extracted in the FMCW manner.

The signal processor may be further configured to extract the distance information about the object by analyzing a waveform of the reception signal in a TOF manner and obtain the speed information about the object by analyzing a frequency of the reception signal in a Doppler manner.

According to an aspect of an example embodiment, there is provided a method of sensing an object by a light detection and ranging (LiDAR) apparatus, the method including: generating continuous wave light; splitting the continuous wave light into a first portion and a second portion; amplifying the first portion of the continuous wave light; intermittently emitting the amplified first portion of the continuous wave light toward an object, the amplified first portion of the continuous wave light being reflected from the object and received by a receiver of the LiDAR apparatus; providing the second portion of the continuous wave light to the receiver; generating a reception signal by combining the first portion of the continuous wave light and the second portion of the continuous wave light that are received by the receiver; and obtaining distance information and speed information about the object based on the reception signal.

BRIEF DESCRIPTION OF THE DRAWINGS

The above and/or other aspects will be more apparent by describing certain example embodiments, with reference to the accompanying drawings, in which.

DETAILED DESCRIPTION

Figure 1:
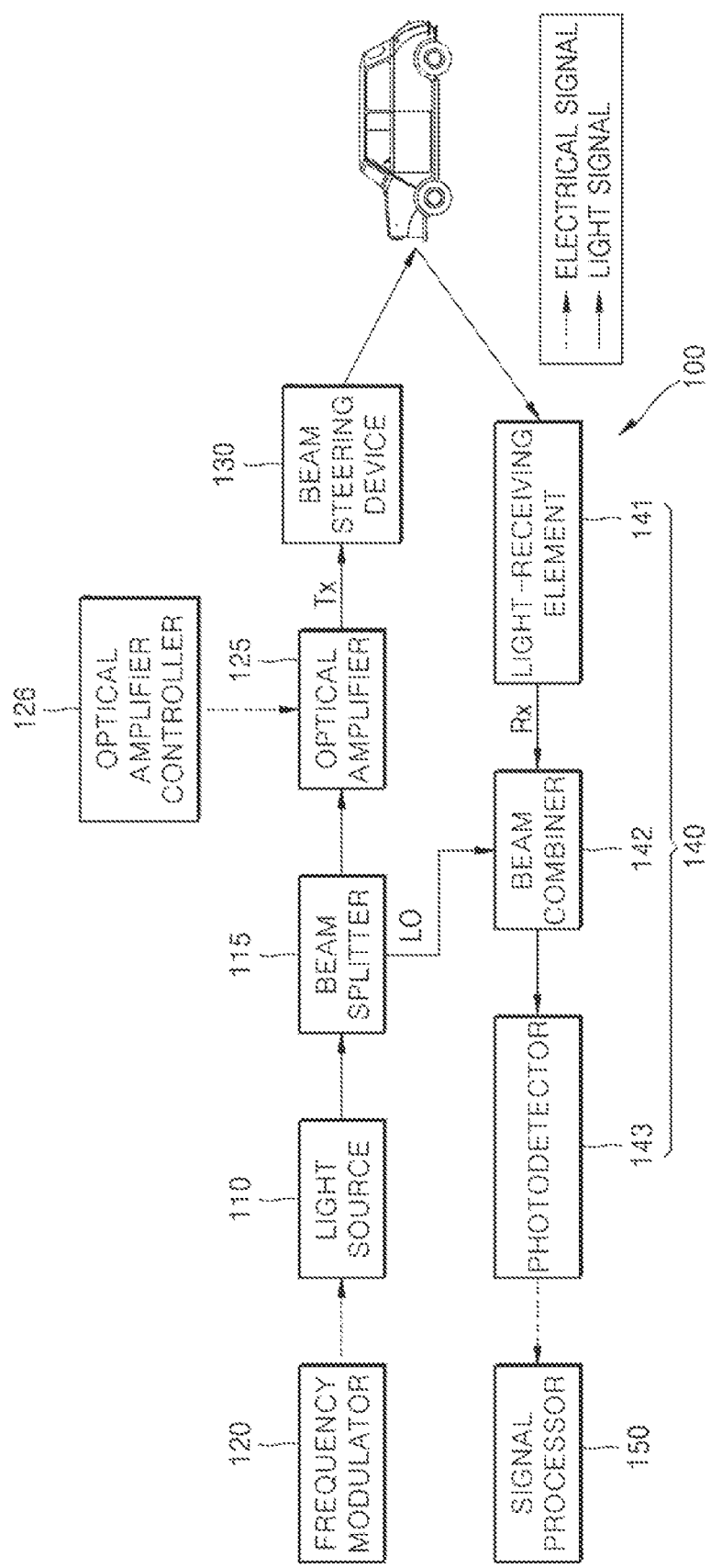
FIG. 1 is a block diagram illustrating a schematic configuration of a light detection and ranging (LiDAR) apparatus according to an example embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

Hereinafter, a light detection and ranging (LiDAR) apparatus using interrupted continuous wave light will be described in detail with reference to the accompanying drawings. In the following drawings, like reference numerals refer to like elements throughout. Also, the size of each layer illustrated in the drawings may be exaggerated for convenience of explanation and clarity. Furthermore, the example embodiments are merely described below, by referring to the figures, to explain aspects of the present description, and the present example embodiments may have different forms. In the layer structure described below, when a constituent element is disposed "above" or "on" to another constituent element, the constituent element may include not only an element directly contacting on the upper/lower/left/right sides of the other constituent element, but also an element disposed above/under/left/right the other constituent element in a non-contact manner.

FIG. 1 is a block diagram illustrating a schematic configuration of a LIDAR apparatus 100 according to an example embodiment. Referring to FIG. 1, the LiDAR apparatus 100 according the example embodiment may include a continuous wave light source 110 that generates continuous wave light, a frequency modulator 120 that drives the continuous wave light source 110 such that the continuous wave light source 110 generates frequency modulated light, a beam steering device 130 that emits or steers, toward an external object (e.g., a vehicle), frequency modulated continuous wave light emitted from the continuous wave light source 110, a receiver 140 that receives light reflected from the external object and forms a reception signal, and a signal processor 150 configured to extract distance information and speed information about the external object based on the reception signal formed by the receiver 140.

The continuous wave light source 110 is configured to continuously oscillate and emit continuous wave light having a waveform such as a sine wave. In addition, the continuous wave light source 110 may be configured to emit laser light of an infrared band invisible to the human eye. For example, the continuous wave light source 110 may be configured to emit laser light having a wavelength in the range of about 800 nm to about 2,000 nm.

The frequency modulator 120 controls the driving of the continuous wave light source 110. The continuous wave light source 110 may be controlled by the frequency modulator 120 to generate frequency modulated continuous wave light. For example, the modulation frequency of the frequency modulator 120 may be about 10 KHz to about 10 MHz, and the modulation bandwidth thereof may be about 100 MHz to about 10 GHz.

In addition, the LiDAR apparatus 100 may further include an optical amplifier 125 and an optical amplifier controller 126. The optical amplifier 125 is configured to amplify the continuous wave light generated by the continuous wave light source 110 and provide an amplified continuous wave light to the beam steering device 130. The optical amplifier controller 126 is configured to control the operation of the optical amplifier 125 to amplify continuous wave light based on a command of the signal processor 150. For example, the optical amplifier controller 126 may control ON/OFF, amplification gain, and the like of the optical amplifier 125. The optical amplifier 125 may be, for example, a high power amplifier having a gain of about 5 dB to about 30 dB and having saturation output power of about 10 mW to about 1,000 mW. By using the optical amplifier 125 that is a high power amplifier, it is possible to use a relatively low cost low power continuous wave laser as the continuous wave light source 110.

The beam steering device 130 may include an optical phase array (OPA) device configured to one- or two-dimensionally scan the continuous wave light generated by the continuous wave light source 110. The beam steering device 130 may transmit the continuous wave laser light amplified by the optical amplifier 125 in a one-dimensional (1D) or two-dimensional (2D) scanning manner toward a front local area. To this end, the beam steering device 130 may steer laser light focused in a narrow area to a front one-dimensional or two-dimensional areas sequentially or non-sequentially at a constant time interval. For example, the beam steering device 130 may be configured to emit laser light from left to right or from right to left for front one-dimensional areas, or be configured to emit laser light from left to right or from right to left and from bottom to top or from top to bottom for front two-dimensional areas.

Figure 2A:
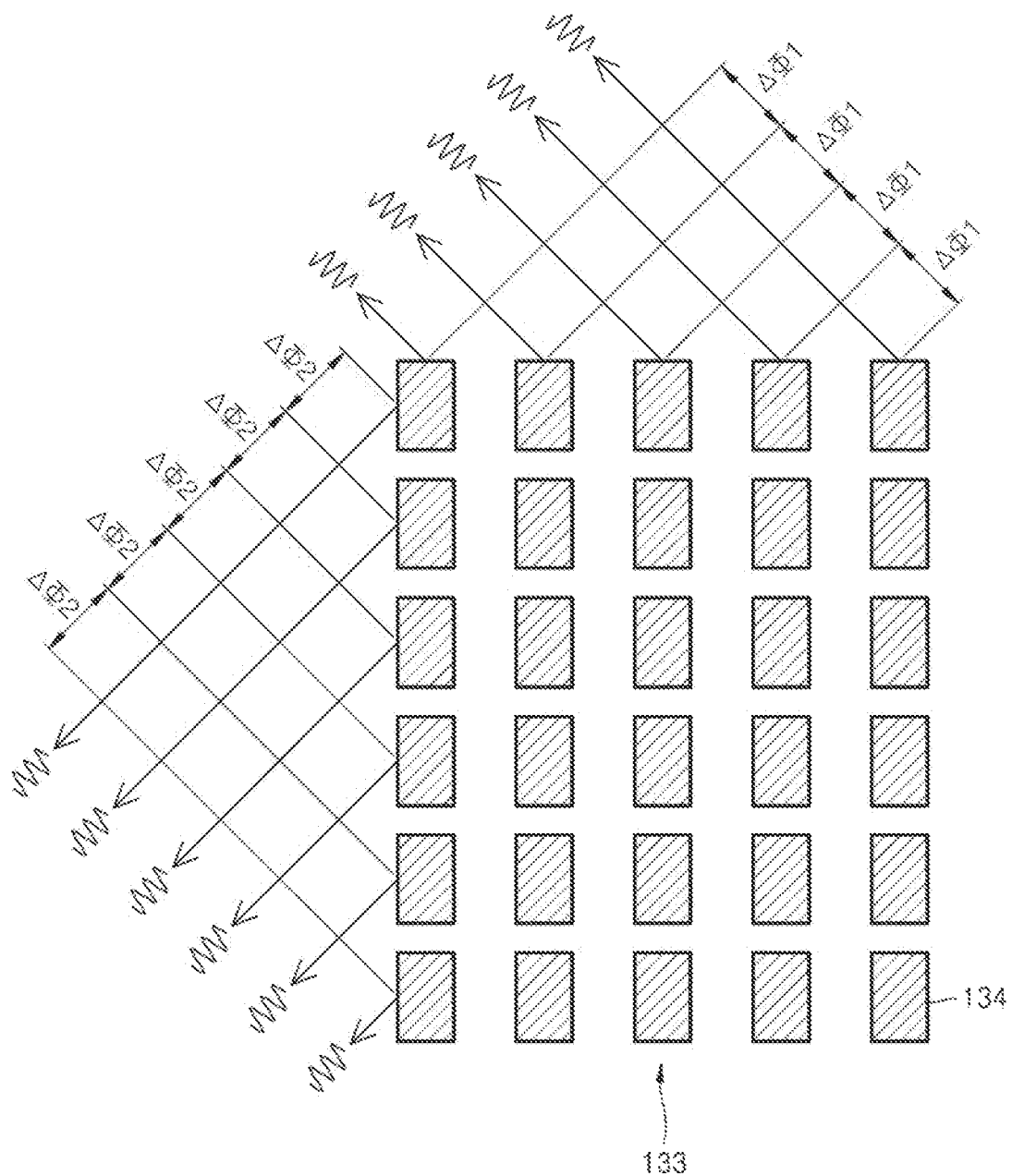
FIGS. 2A to 2C illustrate examples of a configuration and operation of an optical phase array for scanning laser light.
Figure 2B:
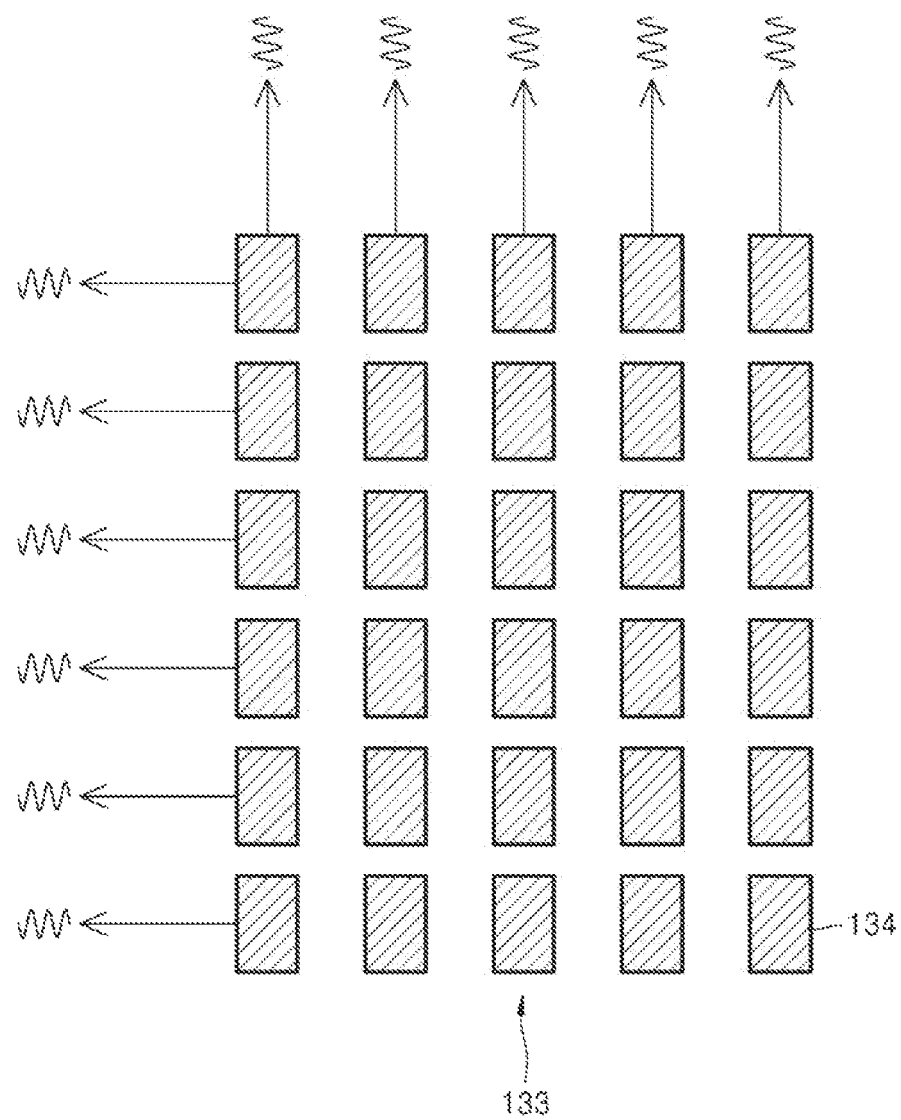
Figure 2C:
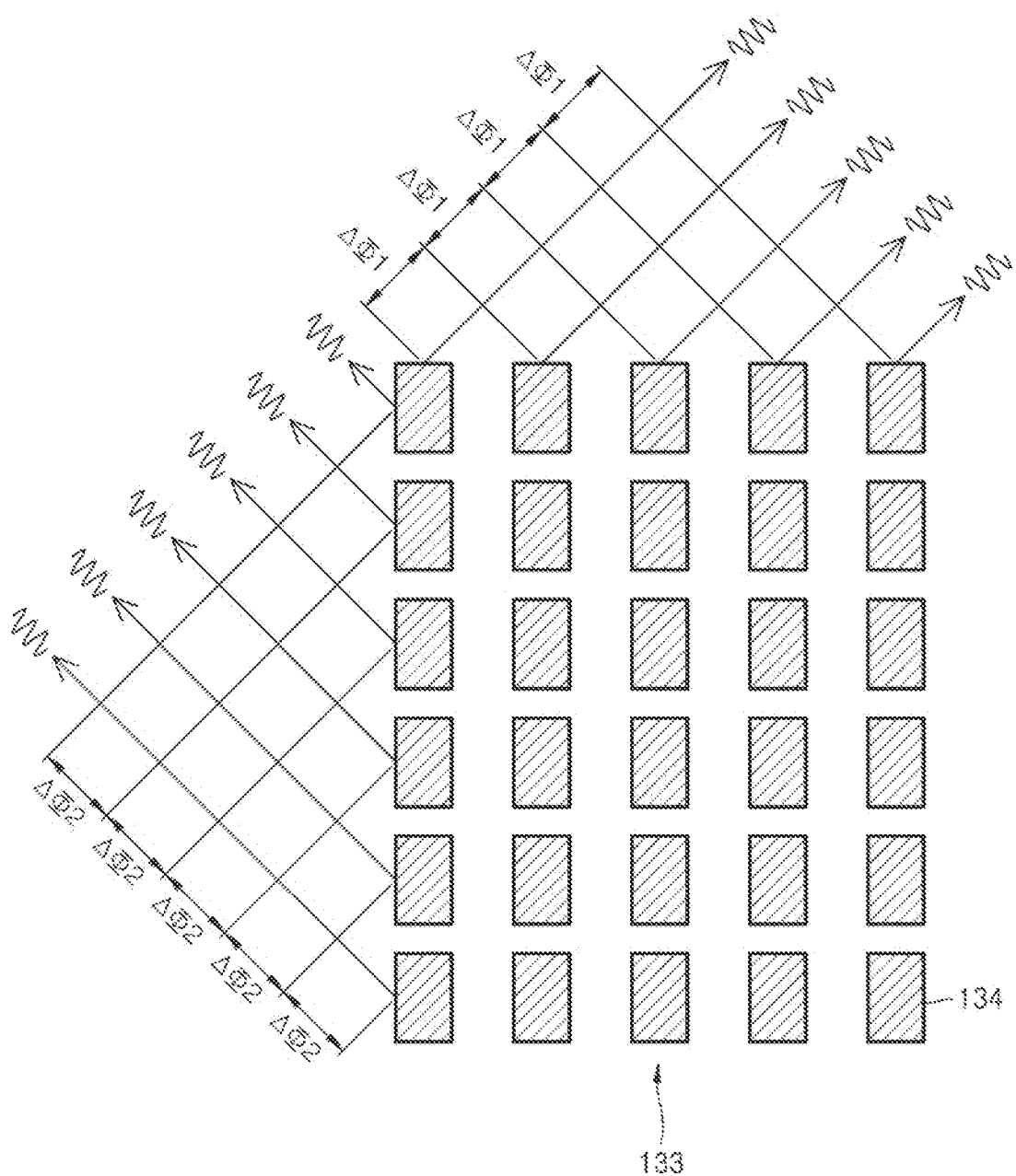

For example, FIGS. 2A to 2C illustrate examples of a configuration and operation of the beam steering device 130 for scanning laser light. Referring to FIG. 2A, the beam steering device 130 may include a transmission element array 133 including a plurality of transmission elements 134 arranged two-dimensionally along a plurality of rows and a plurality of columns. The beam steering device 130 may further include a driving circuit for driving each of the transmission elements 134 of the transmission element array 133. Each transmission element 134 may be, for example, a reflective antenna resonator that delays the phase of incident light to reflect the incident light or a transmissive antenna resonator that delays the phase of incident light to transmit the incident light. The phase of reflected or transmitted laser light may be determined by a voltage applied to each transmission element 134 under the control of the driving circuit.

In this structure, the direction of laser light emitted from the transmission element array 133 may be controlled according to a phase difference between pieces of laser light emitted from the plurality of transmission elements 134. Specifically, the traveling direction of the laser light may be controlled in a horizontal direction according to a phase difference $\Delta\Phi1$ between pieces of laser light emitted from a plurality of transmission elements 134 arranged along the same row. In addition, the traveling direction of the laser light may be controlled in a vertical direction according to a phase difference $\Delta\Phi2$ between pieces of laser light emitted from a plurality of transmission elements 134 arranged along the same column.

For example, as shown in FIG. 2A, when the phase of the laser light is gradually delayed from a transmission element 134 disposed at the right end to a transmission element 134 disposed at the left end in the same row, the laser light travels in a left direction. An angle at which the laser light travels in an azimuthal direction may be determined by a phase difference $\Delta\Phi1$ between pieces of laser light emitted from two adjacent transmission elements 134 in the same row. When the phase difference $\Delta\Phi1$ increases, the laser light is inclined further to the left side, and when the phase difference $\Delta\Phi1$ decreases, the laser light travels closer to the front side.

Furthermore, when the phase of the laser light is gradually delayed from a transmission element 134 disposed at the top to a transmission element 134 disposed at the bottom in the same column, the laser light travels downward. In this case, an angle at which the laser light travels in an elevation angle direction may be determined by a phase difference $\Delta\Phi2$ between pieces of laser light emitted from two adjacent transmission elements 134 in the same column. When the phase difference ΔΦ2 increases, the laser light is inclined further downward, and when the phase difference ΔΦ1 decreases, the laser light travels closer to the front side.

Referring to FIG. 2B, the laser light emitted from the transmission element array 133 is completely directed to the front side when the phase difference ΔΦ1 is 0 and the phase difference ΔΦ2 is 0. Also, referring to FIG. 2C, when the phase of the laser light is gradually delayed from a transmission element 134 disposed at the left end to a transmission element 134 disposed at the right end in the same row, the laser light travels in a right direction. When the phase of the laser light is gradually delayed from a transmission element 134 disposed at the bottom to a transmission element 134 disposed at the top in the same column, the laser light travels upward.

Therefore, when the phases of pieces of laser light emitted from the plurality of transmission elements 134 of the transmission element array 133 are individually controlled, the laser light may be steered in a desired direction. The transmission element array 133 may be configured to apply voltages to the plurality of transmission elements 134 independently from each other under the control of the driving circuit. The phase of laser light emitted from each transmission element 134 may be determined by a voltage applied to the transmission element 134, and the direction of laser light emitted from the transmission element array 133 may be determined by a combination of voltages applied to the plurality of transmission elements 134.

In FIG. 2A to FIG. 2C, the transmission element array 133 is illustrated as including a plurality of transmission elements 134 arranged two-dimensionally along a plurality of rows and a plurality of columns, but is not necessarily limited thereto. For example, the transmission element array 133 may include a plurality of transmission elements 134 arranged one-dimensionally along one row and a plurality of columns or along a plurality of rows and one column. In this case, the transmission module 120 may transmit laser light in a one-dimensional (1D) scanning manner toward the front.

So far, the beam steering device 130 has been described as scanning laser light by using an optical phase array method, but is not necessarily limited thereto. The beam steering device 130 may scan laser light by another scanning method instead of the optical phase array method. For example, the beam steering device 130 may include an actuator that rotates the continuous wave light source 110. In this case, the direction of the laser light may be adjusted by directly rotating the continuous wave light source 110. In another example, the beam steering device 130 may include a mirror that reflects laser light and an actuator that rotates the mirror, or may include a micro electro mechanical system (MEMS) device that controls the direction of reflection of the laser light by electrically controlling a fine tilt of the mirror.

Light transmitted from the beam steering device 130 is reflected by an external object and returned to the LiDAR apparatus 100. The LiDAR apparatus 100 may receive the light reflected from an external object, generate an electrical reception signal from the light, and obtain information about the external object from the electrical reception signal. When receiving light the reflected from the external object to form the electrical reception signal, frequency-modulated continuous wave light emitted from the continuous wave light source 110 may be split and a portion of the frequency-modulated continuous wave light may be used as local oscillator light for frequency analysis. To this end, the LiDAR apparatus 100 may further include a beam splitter 115 that splits the frequency-modulated continuous wave light emitted from the continuous wave light source 110 and provides most of the frequency-modulated continuous wave light to the beam steering device 130 and provides the remaining portion to the receiver 140. For example, the beam splitter 115 may be configured to provide at least 90% of incident light to the beam steering device 130 and to provide the remaining portion to the receiver 140 as local oscillator light. In particular, the beam splitter 115 may be disposed in an optical path between the continuous wave light source 110 and the optical amplifier 125 to provide the optical amplifier 125 with most of the incident light incident from the continuous wave light source 110.

The receiver 140 is configured to form an electrical reception signal for interference light obtained by interference between light reflected from an external object and local oscillator light provided from the beam splitter 115. For example, the receiver 140 may include a light-receiving element 141 that receives light reflected from an external object, a beam combiner 142 that combines light received by the light-receiving element 141 with local oscillator light provided from the beam splitter 115 to make the received light and the local oscillator light interfere with each other, and a photodetector 143 that converts the intensity of interference light into an electrical signal. The light-receiving element 141 may include, for example, a lens or a lens array. The receiver 140 may further include a band pass filter or low pass filter for removing noise components and obtaining interference light components. The receiver 140 may convert the interference light into an electrical signal through the photodetector 143 to form an electrical reception signal. Since the interference light is in a relatively narrow frequency band, a relatively narrow band receiver may be used as the receiver 140 compared to a receiver used in a pulsed LiDAR apparatus.

The signal processor 150 may extract distance information and speed information about an external object based on a reception signal received from the receiver 140. In addition, the signal processor 150 may be configured to control the frequency modulator 120 to adjust a frequency modulation scheme, and to control the beam steering device 130 to control a scanning operation. Although shown in FIG. 1 as separate blocks for convenience, the signal processor 150, the frequency modulator 120, and the receiver 140 may be integrally implemented in one semiconductor chip. Instead, the signal processor 150, the frequency modulator 120, and the receiver 140 may be formed on one printed circuit board. Alternatively, the frequency modulator 120 and the receiver 140 may be integrally implemented as one semiconductor chip, and the signal processor 150 may be implemented as software that may be executed in a computer and stored in a recording medium. According to another example, the signal processor 150 may be implemented as a programmable logic controller (PLC), a field-programmable gate array (FPGA), or the like.

Figure 3:
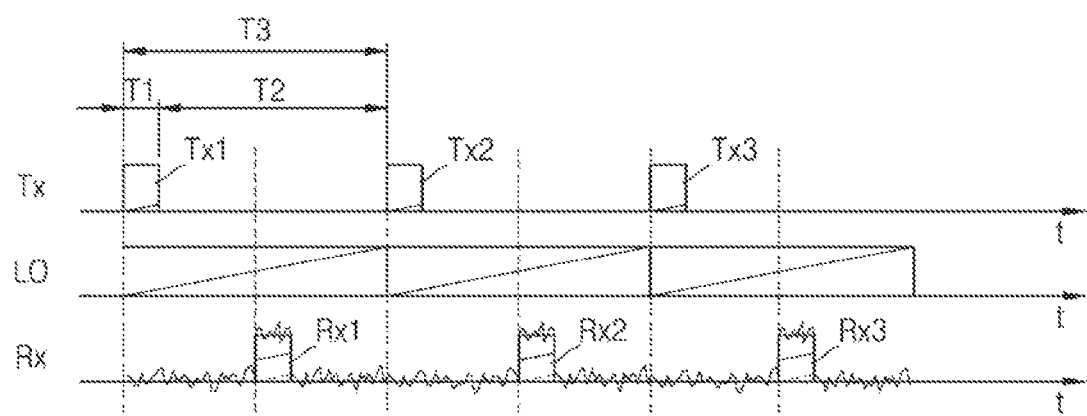
FIG. 3 is a timing diagram showing an operation of the LiDAR apparatus shown in FIG. 1, according to an example embodiment.

According to the present example embodiment, the optical amplifier 125 and the beam steering device 130 may be configured to interruptedly (intermittently or discontinuously) amplify frequency-modulated continuous wave light under the control of the signal processor 150 and interruptedly (intermittently or discontinuously) emit the amplified frequency-modulated continuous wave light. For example, FIG. 3 is a timing diagram showing an operation of the LiDAR apparatus 100 shown in FIG. 1, according to an example embodiment. Referring to FIG. 3, the beam steering device 130 may be configured to emit frequency-modulated continuous wave light to the outside only during a first time T1 and not to emit the frequency-modulated continuous wave light to the outside during the second time T2, under the control of the signal processor 150.

To this end, the signal processor 150 may activate the optical amplifier 125 and the beam steering device 130 during the first time T1 and stop the operations of the optical amplifier 125 and the beam steering device 130 during the second time T2. Then, the light outputs of the optical amplifier 125 and the beam steering device 130 are stopped during the second time T2, and thus, light is not emitted to the outside of the LiDAR apparatus 100. Even when the operation of the beam steering device 130 is interrupted, the continuous wave light source 110 and the frequency modulator 120 continue to generate frequency-modulated continuous wave light without stopping operation to continuously provide local oscillator light for forming a reception signal to the receiver 140.

The signal processor 150 may control the beam steering device 130 to periodically repeat the first time T1 for emitting continuous wave light and the second time T2 for not emitting the continuous wave light. In this manner, the LiDAR apparatus 100 may emit pieces of transmission light Tx1, Tx2, Tx3, . . . in sequence. Each of the pieces of transmission light Tx1, Tx2, Tx3, . . . is similar to pulsed light in that it lasts only for the first time T1 and is interrupted and thereby is not transmitted for the second time T2. However, each of the pieces of transmission light Tx1, Tx2, Tx3, . . . is different from general pulsed light in that it is frequency-modulated continuous wave light, the frequency of which changes over time. The frequency of the general pulsed light remains constant over time when dispersion is not taken into account.

The first time T1 for which each of the pieces of transmission light Tx1, Tx2, Tx3, . . . lasts and the second time T2 for which each of the pieces of transmission light Tx1, Tx2, Tx3, . . . is interrupted may be appropriately selected as necessary. For example, the first time T1 and the second time T2 may be determined based on a time for which light emitted from the LiDAR apparatus 100 is reflected from an external object and returned to the LiDAR apparatus 100, and the horizontal viewing angle, vertical viewing angle, horizontal scanning resolution, vertical scanning resolution, frame rate, and the like of the beam steering device 130. The first time T1 may be selected within a range of about 1 ns to about 1,000 ns. In addition, when considering a time for receiving pieces of reception light Rx1, Rx2, Rx3, . . . that are reflected from an external object and returned to the LiDAR apparatus 100, the second time T2 may be determined to be longer than the first time T1.

The receiver 140 receives each of the pieces of reception light Rx1, Rx2, Rx3, . . . that are reflected from an external object and returned, and generates an electrical reception signal. As described above, the electrical reception signal may be obtained from interference light occurring by interference between local oscillator light for frequency analysis provided from the continuous wave light source 110 and each of the pieces of reception light Rx1, Rx2, Rx3, . . . . For example, when the receiver 140 receives first reception light Rx1 at time t1 after first transmission light Tx1 emitted at time t0 is reflected from an external object, an electric reception signal may be obtained by interference between local oscillator light having a frequency component of continuous wave light emitted from the continuous wave light source 110 at the time t1 and the first reception light Rx1. In addition, when second transmission light Tx2 is emitted at time t2 and second reception light Rx2 is received at time t3, an electrical reception signal may be obtained by interference between local oscillator light having a frequency component of continuous wave light emitted from the continuous wave light source 110 at the time t3 and the second reception light Rx2. Similarly, when third transmission light Tx3 is emitted at time t4 and third reception light Rx3 is received at time t5, an electrical reception signal may be obtained by interference between local oscillator light having a frequency component of continuous wave light emitted from the continuous wave light source 110 at the time t5 and the third reception light Rx3.

The first reception light Rx1, the second reception light Rx2, and the third reception light Rx3 have frequency components that are modified according to the relative speed of an object. For example, when a relative speed with respect to an object is 0, the first reception light Rx1 may have the same frequency component as continuous wave light emitted from the continuous wave light source 110 at the time t0. In addition, when an object approaches, the first reception light Rx1 may have a frequency component higher than that of the continuous wave light emitted from the continuous wave light source 110 at the time t0. On the contrary, when the object moves away, the first reception light Rx1 may have a frequency component lower than that of the continuous wave light emitted from the continuous wave light source 110 at the time t0.

The signal processor 150 may extract distance information and speed information about an external object based on an electrical reception signal provided from the receiver 140. For example, the signal processor 150 may be configured to analyze the frequency of a reception signal in a frequency-modulated continuous wave (FMCW) manner to extract distance information and speed information about an object. In particular, the signal processor 150 may analyze the frequency of a reception signal in a linear FMCW manner. To this end, the signal processor 150 may control the frequency modulator 120 to perform frequency modulation in such a manner that the frequency of continuous wave light emitted from the continuous wave light source 110 linearly increases with the period of a third time T3. For example, the frequency of the continuous wave light emitted from the continuous wave light source 110 may linearly increase from a minimum frequency to a maximum frequency during the third time T3, and then may linearly increase again from the minimum frequency to the maximum frequency for the third time T3 thereafter.

Figure 4:
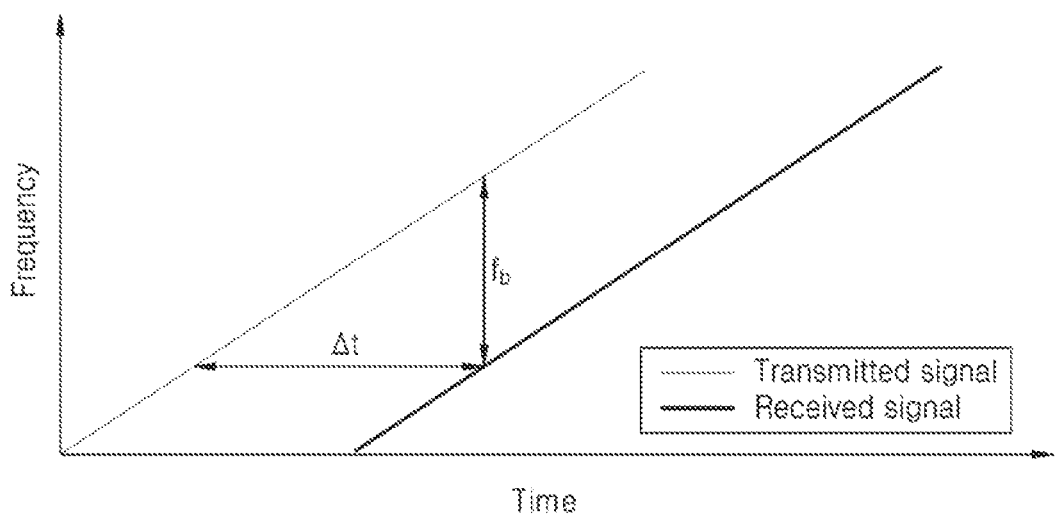
FIG. 4 is a graph showing a frequency component of transmission light and a frequency component of reception light in a linear frequency-modulated continuous wave (FMCW) method.

FIG. 4 is a graph showing a frequency component of transmission light and a frequency component of reception light in a linear FMCW method. In FIG. 4, the vertical axis of the graph represents frequency and the horizontal axis of the graph represents time. Between the transmission light and the reception light, there is a time delay of $\Delta t$ in a horizontal direction and a frequency difference of fb in a vertical direction. According to the linear FMCW method, distance information and speed information may be extracted by performing a two-dimensional fast Fourier transform (FFT) on an M×N matrix obtained by sampling M times in a frequency domain and N times in a time domain. Here, M and N are natural numbers greater than one. For example, distance information may be obtained by performing an FFT in a frequency domain, and speed information may be obtained by performing an FFT in a time domain.

In addition, the signal processor 150 may extract distance information about an object in a ToF manner, by using a time difference between a time at which transmission light is emitted and a time at which reception light is received. There are already various ToF methods for obtaining distance information. In general, since it is difficult to directly and accurately measure a time difference, distance information about an object may be extracted by using a phase difference between transmission light and reception light, the phase difference being obtained by analyzing a waveform of a reception signal. In this case, through a cross-correlation between a reception signal and a transmission signal, only a signal component related to the transmission signal may be obtained from the reception signal, and the accuracy of distance measurement may be improved by analyzing the waveform of the signal component related to the transmission signal.

Therefore, the signal processor 150 may obtain distance information through an FMCW method and may obtain distance information through a ToF method. The signal processor 150 may adjust distance information about an object by using both the distance information obtained by the FMCW method and the distance information obtained by the ToF method in order to further improve the accuracy of the distance measurement. For example, a distance obtained by the FMCW method and a distance obtained by the ToF method may be simply averaged. Alternatively, a weighted average may be obtained by multiplying the distance obtained by the FMCW method by a first weight and multiplying the distance obtained by the ToF method by a second weight, based on an error change according to distance in the FMCW method and an error change according to distance in the ToF method. Alternatively, only the distance obtained by the FMCW method or the distance obtained by the ToF method may be selected according to a distance range.

As described above, the LiDAR apparatus 100 according to the present example embodiment generates continuous wave light by using the continuous wave light source 110 that is a low power continuous wave light source. In addition, the continuous wave light modulated by the frequency modulator 120 is amplified by a high power optical amplifier 131 and interruptedly emitted like a pulse. Therefore, the LIDAR apparatus 100 according to the example embodiment may not need to use an expensive high power continuous wave light source. In addition, since the high power optical amplifier 131 temporarily operates only for a short time, the power consumption of the LiDAR apparatus 100 according to the present example embodiment is low. In addition, since frequency-modulated light is used, reflected light may be received using the receiver 140 of a relatively narrow band, thereby effectively suppressing noise.

In the example embodiment shown in FIG. 3, the beam steering device 130 may be configured to emit frequency-modulated continuous wave light only one time for the third time T3. For example, during a first third time T3, the beam steering device 130 may emit the first transmission light Tx1 and the receiver 140 may receive the first reception light Rx1. During a subsequent third time T3, the beam steering device 130 may emit the second transmission light Tx2 and the receiver 140 may receive the second reception light Rx2. In this case, the third time T3 may be equal to the sum of the first time T1 and the second time T2.

Figure 5:
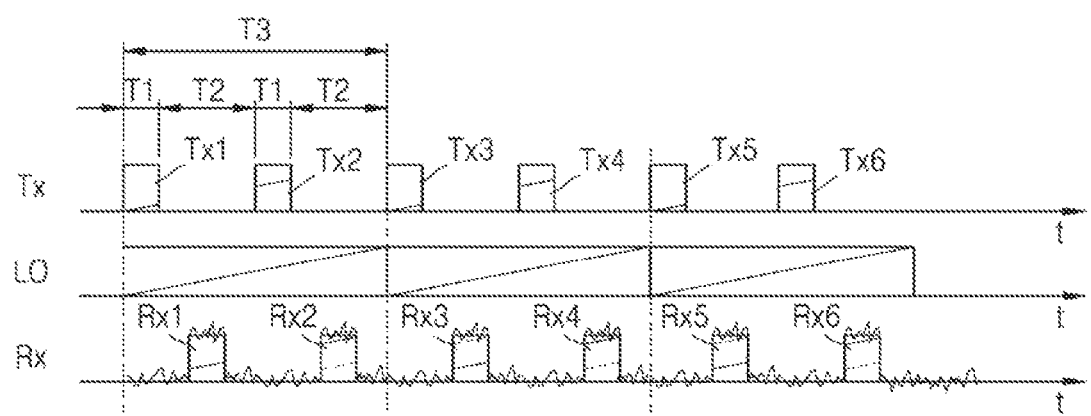
FIG. 5 is a timing diagram showing an operation of the LiDAR apparatus shown in FIG. 1, according to another example embodiment.

However, the present disclosure is not necessarily limited thereto. For example, FIG. 5 is a timing diagram showing an operation of the LiDAR apparatus 100 shown in FIG. 1, according to another example embodiment. Referring to FIG. 5, the beam steering device 130 may be configured to emit frequency-modulated continuous wave light twice during the third time T3 under the control of the signal processor 150. For example, the beam steering device 130 may emit first transmission light Tx1 and second transmission light Tx2 under the control of the signal processor 150 during a first third time T3. Then, the receiver 140 may receive first reception light Rx1 and second reception light Rx2 during the first third time T3. During a subsequent third time T3, the beam steering device 130 may emit third transmission light Tx3 and fourth transmission light Tx4 and the receiver 140 may receive third reception light Rx3 and fourth reception light Rx4. In this case, the third time T3 may be greater than the sum of the first time T1 and the second time T2. In this manner, the beam steering device 130 may emit frequency-modulated continuous wave light two or more times during the third time T3.

Moreover, the beam steering device 130 may be configured to emit transmission light toward one area in front of the beam steering device 130 under the control of the signal processor 150 and then emit transmission light toward another area in front of the beam steering device 130. In other words, the beam steering device 130 may sequentially scan a plurality of local areas in front of the beam steering device 130 in such a manner as to emit transmission light one by one toward one area in front of the beam steering device 130. For example, the beam steering device 130 may emit the first transmission light Tx1 to a first area in front of the beam steering device 130 and then emit the second transmission light Tx2 to a second area different from the first area.

However, the present disclosure is not limited thereto, and in order to improve a signal-to-noise ratio (SNR), the beam steering device 130 may be configured to emit transmission light multiple times toward one area in front of the beam steering device 130 under the control of the signal processor 150 and then emit transmission light multiple times toward another area. For example, the beam steering device 130 may sequentially emit first transmission light Tx1, second transmission light Tx2, and third transmission light Tx3 toward a first area in front of the beam steering device 130 and then sequentially emit fourth transmission light Tx4, fifth transmission light Tx5, and sixth transmission Tx6 toward a second area different from the first area.

In this case, the signal processor 150 may accumulate electrical reception signals for the first reception light Rx1, the second reception light Rx2, and the third reception light Rx3 sequentially received from the receiver 140 and may extract distance information and speed information about an object in the first area based on the accumulated electrical reception signals. Subsequently, the signal processor 150 may accumulate electrical reception signals for the fourth reception light Rx4, the fifth reception light Rx5, and the sixth reception light Rx6 sequentially received from the receiver 140 and may extract distance information and speed information about the object in the second area based on the accumulated reception signals.

Then, since the SNR of a reception signal is improved, the accuracy may be improved compared to a case where the distance information and the speed information are extracted with only one reception light obtained from one area. The number of successive emissions of transmission light for one area may be differently selected according to a surrounding situation. For example, when the SNR is good, the signal processor 150 may determine to emit transmission light only once for one area. In addition, when the SNR is low, the signal processor 150 may determine to continuously transmit transmission light up to 1,000 times for one area. This method of accumulating a plurality of reception signals for one same area and extracting distance information and speed information may also be applied to the example embodiment illustrated in FIG. 3.

Figure 6:
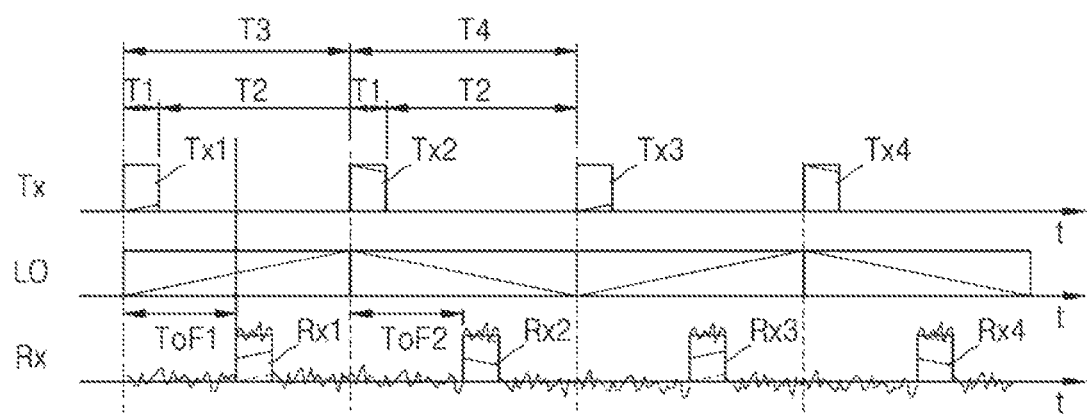
FIG. 6 is a timing diagram showing an operation of the LiDAR apparatus shown in FIG. 1, according to another example embodiment.

In addition, the signal processor 150 may extract distance information and speed information about the front object by analyzing the frequency of a reception signal in a triangular FMCW method. For example, FIG. 6 is a timing diagram showing an operation of the LiDAR apparatus 100 shown in FIG. 1, according to another example embodiment. Referring to FIG. 6, the signal processor 150 may control the frequency modulator 120 to perform frequency modulation in such a way that the frequency of continuous wave light emitted from the continuous wave light source 110 linearly increases for a third time T3 and linearly decreases for a subsequent fourth time T4. In this case, the frequency of the continuous wave light emitted from the continuous wave light source 110 may linearly increase from a minimum frequency to a maximum frequency for the third time T3 and then linearly decrease from the maximum frequency to the minimum frequency for the subsequent fourth time T4. The signal processor 150 may control the frequency modulator 120 such that the third time T3 for which the frequency of frequency-modulated continuous wave light linearly increases and the fourth time T4 for which the frequency of the frequency-modulated continuous wave light linearly decreases are periodically repeated.

In the example embodiment shown in FIG. 6, the beam steering device 130 may be configured to emit frequency-modulated continuous wave light only one time for a third time T3 and emit frequency-modulated continuous wave light only one time for a fourth time T4. For example, during the third time T3, the beam steering device 130 may emit first transmission light Tx1 and the receiver 140 may receive first reception light Rx1. During the fourth time T4, the beam steering device 130 may emit second transmission light Tx2 and the receiver 140 may receive second reception light Rx2. During a subsequent third time T3, the beam steering device 130 may emit third transmission light Tx3 and the receiver 140 may receive third reception light Rx3, and during the fourth time T4, the beam steering device 130 may emit fourth transmission light Tx4 and the receiver 140 may receive fourth reception light Rx4. In this case, each of the third time T3 and the fourth time T4 may be equal to the sum of the first time T1 and the second time T2. In addition, in the first transmission light Tx1 and the third transmission light Tx3 and the first reception light Rx1 and the third reception light Rx3, the frequency linearly increases, and in the second transmission light Tx2 and the fourth transmission light Tx4 and the second reception light Rx2 and the fourth reception light Rx4, the frequency linearly decreases.

Figure 7:
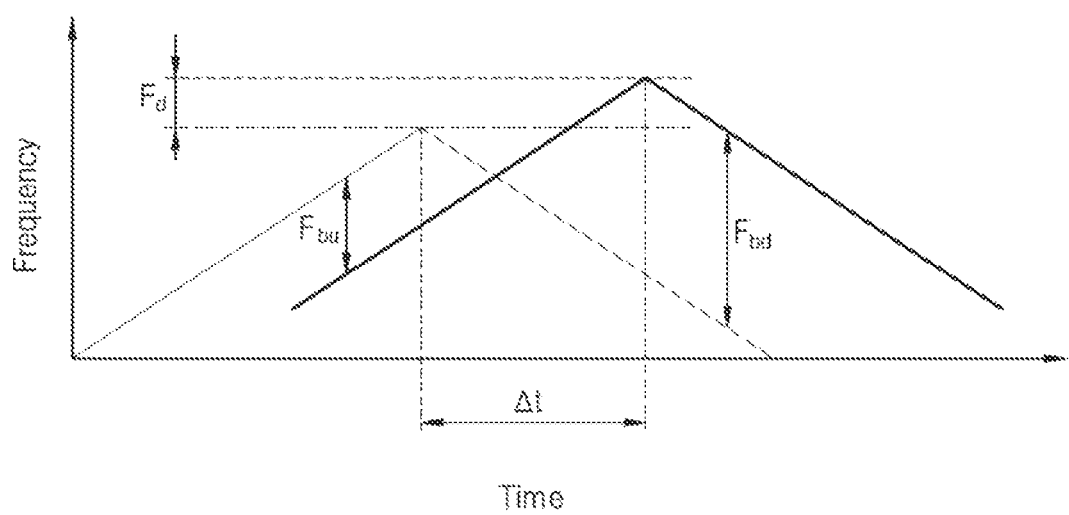
FIG. 7 is a graph showing a frequency component of transmission light and a frequency component of reception light in a triangular FMCW method.

FIG. 7 is a graph showing a frequency component of transmission light and a frequency component of reception light in a triangular FMCW method. In FIG. 7, the vertical axis of the graph represents frequency and the horizontal axis of the graph represents time. As shown in FIG. 7, graphs of the transmission light and the reception light show triangular forms in which the frequency linearly increases with time and then linearly decreases with time. There is a time delay of Δt between the frequency peak of the transmission light and the frequency peak of the reception light. The peak position of the transmission light may be known from local oscillator light for frequency analysis. The reception light has only some information of a frequency rising section and some information of a frequency falling section. For example, the first reception light Rx1 and the third reception light Rx3 provide only some information of the frequency rising section, and the second reception light Rx2 and the fourth reception light Rx4 provide only some information of the frequency falling section. The signal processor 150 may determine, as the frequency peak of the reception light, an intersection point obtained by extending the frequency rising slopes of the first reception light Rx1 and the third reception light Rx3 and the frequency falling slopes of the second reception light Rx2 and the fourth reception light Rx4.

When a relative speed of an object in front is not 0, a frequency shift occurs in reception light received through the receiver 140, due to a Doppler effect. For this reason, there is a frequency difference by Fd between the frequency peak of the transmission light and the frequency peak of the reception light. For example, when the front object approaches, the frequency of the reception light becomes higher than the frequency of the transmission light, as shown in FIG. 7. On the contrary, when the front object moves away, the frequency of the reception light becomes lower than the frequency of the transmission light.

In this case, a distance R and a relative speed V of the front object may be obtained by Equation 1 and Equation 2, respectively.

$$R = \frac{cT_m}{2B} \frac{(F_{bu} + F_{bd})}{2}$$ [Equation 1]

$$v = \frac{\lambda}{2} \frac{(F_{bd} - F_{bu})}{2}$$ [Equation 2]

In Equations 1 and 2 above, B represents a frequency difference between a minimum frequency and a maximum frequency of local oscillator light, Tm represents a time difference (i.e., a time span of the third time T3 or the fourth time T4) between the minimum frequency and the maximum frequency of the local oscillator light, $F_{bu}$ represents a frequency difference between the transmission light and the reception light in the frequency rising section, $F_{bd}$ represents a frequency difference between the transmission light and the reception light in the frequency falling section, λ represents the wavelength of the local oscillator light which corresponds to the minimum frequency in an initial stage (i.e., t=0), and c represents the speed of light. The signal processor 150 may extract distance information and speed information about an object in a triangular FMCW manner by using Equations 1 and 2 above, based on a reception signal obtained from transmission light emitted during the third time T3 and reception light formed by reflecting the transmission light, and a reception signal obtained from transmission light emitted during the fourth time T4 and reception light formed by reflecting the transmission light.

In addition, even in the example embodiment shown in FIG. 6, the signal processor 150 may obtain distance information by using an FMCW method and may obtain distance information by using a ToF method. The signal processor 150 may improve the accuracy of distance information about an object by using both the distance information obtained by the FMCW method and the distance information obtained by the ToF method.

In the example embodiment shown in FIG. 6, the beam steering device 130 may be configured to emit transmission light toward one area in front of the beam steering device 130 for the third time T3 and the fourth time T4 under the control of the signal processor 150 and then emit transmission light toward another area in front of the beam steering device 130 for a subsequent third time T3 and a subsequent fourth time T4. For example, the beam steering device 130 may emit the first transmission light Tx1 and the second transmission light Tx2 toward a first area in front of the beam steering device 130 and then emit the third transmission light Tx3 and the fourth transmission light Tx4 toward a second area different from the first area.

However, the present disclosure is not limited thereto, and in order to improve the SNR, the beam steering device 130 may emit transmission light multiple times, i.e., four or more times, toward one area in front of the beam steering device 130 under the control of the signal processor 150 and then emit transmission light multiple times, i.e., four or more times, toward another area. For example, the beam steering device 130 may sequentially emit the first transmission light Tx1, the second transmission light Tx2, the third transmission light Tx3, and the fourth transmission light Tx4 toward the first area. In addition, the signal processor 150 may accumulate electrical reception signals for the first reception light Rx1 and the third reception light Rx3 received from the receiver 140 in a frequency rising section and then accumulate electrical reception signals for the second reception light Rx2 and the fourth reception light Rx4 received from the receiver 140 in a frequency falling section. The signal processor 150 may extract distance information and speed information about an object in the first area based on the reception signals accumulated in the frequency rising section and the reception signals accumulated in the frequency falling section. The signal processor 150 may variably determine the number of successive emissions of transmission light for one area based on the SNR of reception signal.

In addition, in the example embodiment illustrated in FIG. 6, the beam steering device 130 may be configured to emit frequency-modulated continuous wave light only one time during each of the third and fourth times T3 and T4. For example, the beam steering device 130 emits the first transmission light Tx1 for a first third time T3 and emits the second transmission light Tx2 for the fourth time T4. In addition, the beam steering device 130 emits the third transmission light Tx3 for a subsequent third time T3 and emits the fourth transmission light Tx4 for the fourth time T4. In this case, each of the third time T3 and the fourth time T4 may be equal to the sum of the first time T1 and the second time T2.

Figure 8:
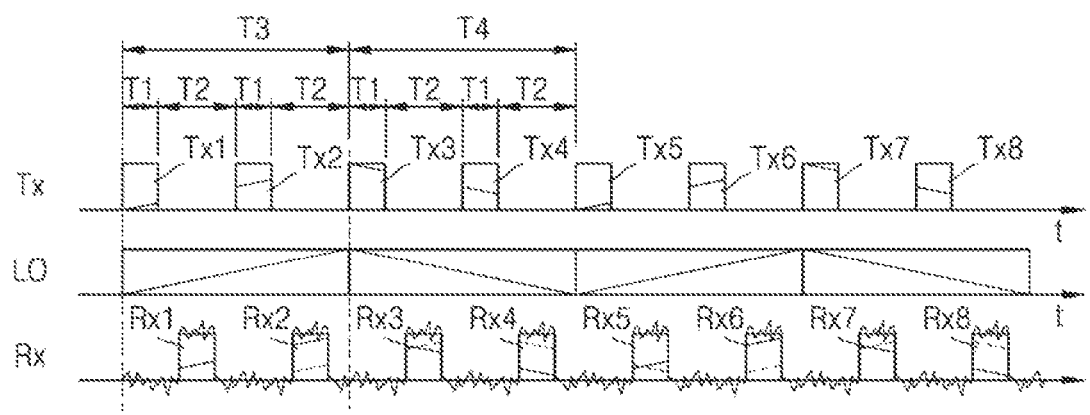
FIG. 8 is a timing diagram showing an operation of the LiDAR apparatus shown in FIG. 1, according to another example embodiment.

However, the present disclosure is not necessarily limited thereto. For example, FIG. 8 is a timing diagram showing an operation of the LiDAR apparatus 100 shown in FIG. 1, according to another example embodiment. Referring to FIG. 8, the beam steering device 130 may be configured to emit frequency-modulated continuous wave light twice during each of the third and fourth times T3 and T4 under the control of the signal processor 150. For example, the beam steering device 130 may emit first transmission light Tx1 and second transmission light Tx2 under the control of the signal processor 150 for a first third time T3 and may emit third transmission light Tx3 and fourth transmission light Tx4 for the fourth time T4. Then, the receiver 140 may receive first reception light Rx1 and second reception light Rx2 for the first third time T3 and may receive third reception light Rx3 and fourth reception light Rx4 for the fourth time T4. In addition, during a subsequent third time T3, the beam steering device 130 may emit fifth transmission light Tx5 and sixth transmission light Tx6 and the receiver 140 may receive fifth reception light Rx5 and sixth reception light Rx6. In this case, each of the third and fourth times T3 and T4 may be greater than the sum of the first time T1 and the second time T2. In this manner, the beam steering device may emit frequency-modulated continuous wave light two or more times during each of the third and fourth times T3 and T4.

Figure 9:
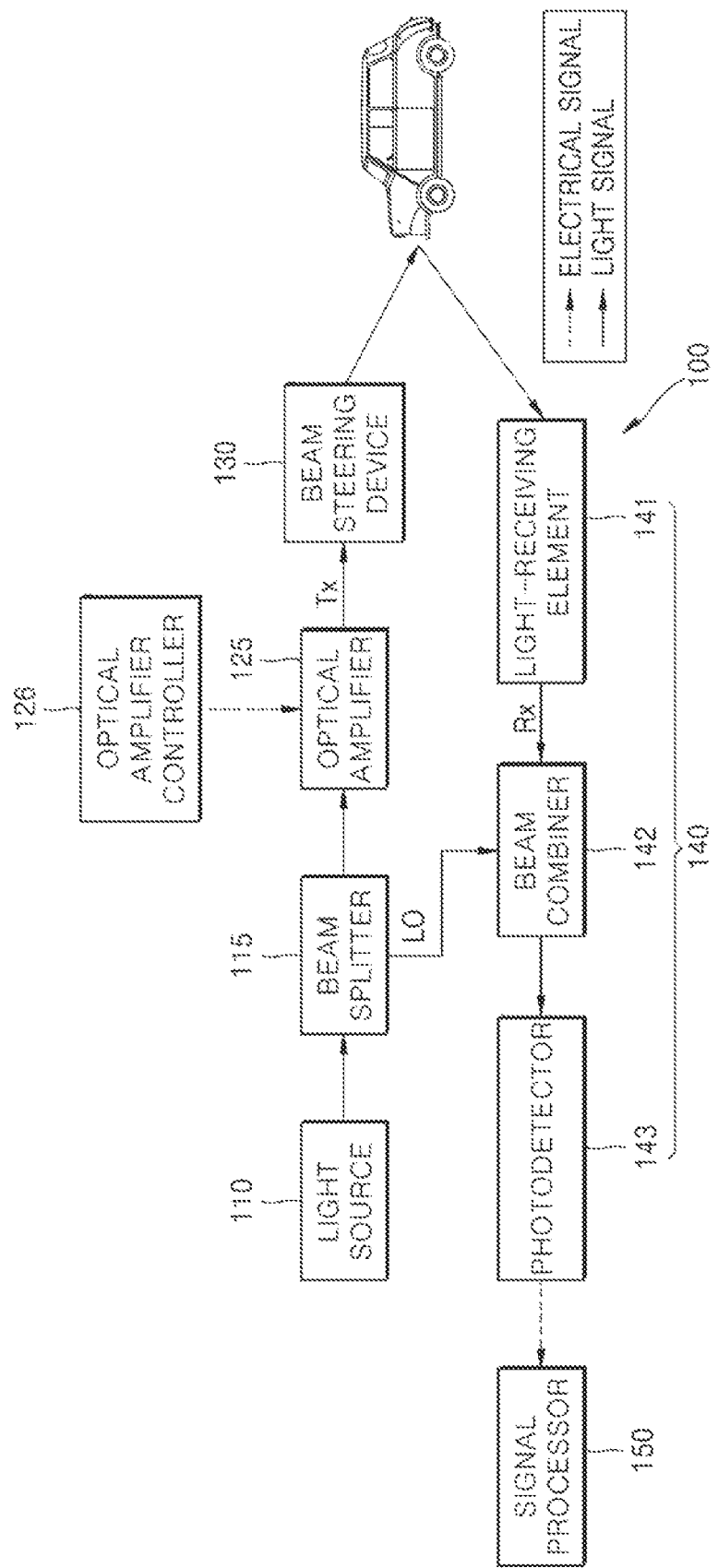
FIG. 9 is a block diagram illustrating a schematic configuration of an LIDAR apparatus according to another example embodiment.

FIG. 9 is a block diagram illustrating a schematic configuration of a LIDAR apparatus 200 according to another example embodiment. Referring to FIG. 9, the LiDAR apparatus 200 according to another example embodiment may include a continuous wave light source 110 that generates continuous wave light, a beam steering device 130 that emits the continuous wave light emitted from the continuous wave light source 110 to the outside, a receiver 140 that receives light reflected from an external object to form a reception signal, and a signal processor 150 configured to extract distance information and speed information about an object based on the reception signal formed by the receiver 140. In addition, the LiDAR apparatus 200 may further include a beam splitter 115 that splits the continuous wave light emitted from the continuous wave light source 110 and provides most of the continuous wave light to the beam steering device 130 and provides the remaining portion to the receiver 140 as local oscillator light for frequency analysis. In addition, the LiDAR apparatus 200 may further include an optical amplifier 125 disposed in an optical path between the beam splitter 115 and the beam steering device 130 to amplify the continuous wave light, and an optical amplifier controller 126 that drives the optical amplifier 125.

The LiDAR apparatus 200 of FIG. 9 is different from the LiDAR apparatus 100 shown in FIG. 1 in that the LiDAR apparatus 200 does not include the frequency modulator 120. In this case, the continuous wave light provided from the continuous wave light source 110 to the beam steering device 130 may not be frequency-modulated and maintains a constant frequency. Accordingly, the operation of the LiDAR apparatus 200 shown in FIG. 9 is the same as that in which the frequency modulator 120 does not perform a frequency modulation operation in the LiDAR apparatus 100 of FIG. 1. Also in the LiDAR apparatus 100 of FIG. 1, under the control of the signal processor 150, the frequency modulator 120 may keep the operating frequency of the continuous wave light source 110 constant without performing a frequency modulation operation. However, if necessary, the LiDAR apparatus 200 that does not include the frequency modulator 120 may be manufactured in a manufacturing stage. For example, the LiDAR apparatus 200 of FIG. 9 may be provided at a lower cost than the LiDAR apparatus 100 of FIG. 1.

Figure 10:
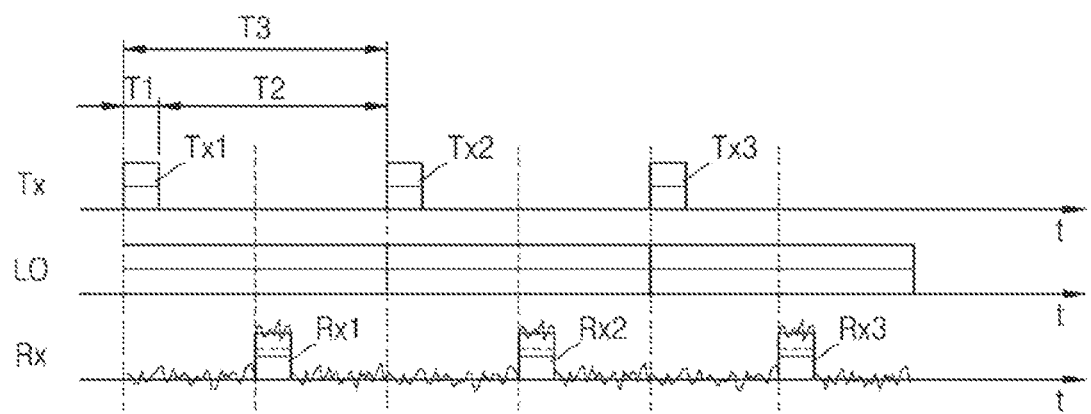
FIG. 10 is a timing diagram showing an operation of the LiDAR apparatus shown in FIG. 9, according to an example embodiment.

FIG. 10 is a timing diagram schematically showing an operation according to an example embodiment of the LiDAR apparatus 200 shown in FIG. 9. Referring to FIG. 10, the beam steering device 130 may be configured to emit continuous wave light to the outside only during a first time T1 and not to emit the continuous wave light to the outside during a second time T2, under the control of the signal processor 150. In addition, the signal processor 150 may control the beam steering device 130 to periodically repeat the first time T1 for emitting the continuous wave light and the second time T2 for not emitting the continuous wave light. In this manner, the LiDAR apparatus 200 may sequentially emit pieces of transmission light Tx1, Tx2, Tx3, . . . . Each of the pieces of lights Tx1, Tx2, Tx3, . . . is similar to pulsed light in that it lasts only for the first time T1 and is interrupted for the second time T2. However, each of the pieces of transmission light Tx1, Tx2, Tx3, . . . is different from general pulsed light in that it is continuous wave light having only one frequency component. For example, general pulsed light having a square or triangular waveform or the like may have a fundamental frequency component and a plurality of harmonic frequency components.

The receiver 140 receives each of pieces of reception light Rx1, Rx2, Rx3, . . . that are reflected from an external object and returned, and generates an electrical reception signal. As described above, the electrical reception signal may be obtained from interference light occurring by interference between local oscillator light for frequency analysis and each of the pieces of reception lights Rx1, Rx2, Rx3, The pieces of reception light Rx1, Rx2, Rx3, . . . have frequency components that are modified by a Doppler effect according to the relative speed of an object. The signal processor 150 may be configured to extract distance information about an object by analyzing the waveform of a reception signal by using a ToF method and extract speed information about the object by analyzing the frequency of the reception signal by a Doppler method.

Also in the example shown in FIG. 10, the beam steering device 130 may be configured to emit transmission light toward one area in front of the beam steering device 130 under the control of the signal processor 150 and then emit transmission light toward another area in front of the beam steering device 130. Instead, the beam steering device 130 may be configured to emit transmission light multiple times toward one area in front of the beam steering device 130 under the control of the signal processor 150 and then emit transmission light multiple times toward another area. The signal processor 150 may accumulate a plurality of electrical reception signals obtained from pieces of reception light reflected from the same area and may extract distance information and speed information about an object in the area based on the accumulated electrical reception signals.

The LiDAR apparatuses 100 and 200 described above may be mounted on a vehicle and configured to extract distances from vehicles in front of the vehicle and relative speed information. However, the LiDAR apparatuses 100 and 200 are not necessarily applicable only to vehicles. For example, the LiDAR apparatuses 100 and 200 according to the present example embodiment may be mounted on a ship, an aircraft, a drone, or the like in addition to a vehicle and used to search and avoid obstacles in front of the ship, the aircraft, the drone, or the like.

While not restricted thereto, an example embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an example embodiment may be written as a computer program transmitted over a computer-readable transmission medium, such as a carrier wave, and received and implemented in general-use or special-purpose digital computers that execute the programs. Moreover, it is understood that in example embodiments, one or more units of the above-described apparatuses and devices can include circuitry, a processor, a microprocessor, etc., and may execute a computer program stored in a computer-readable medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A light detection and ranging (LiDAR) apparatus comprising:
   a continuous wave light source configured to generate continuous wave light having one frequency component;
   a beam splitter configured to split the continuous wave light into a first continuous wave light and a second continuous wave light;
   a beam steering device configured to emit the first continuous wave light to an object for a first period of time and stop emitting the first continuous wave light to the object for a second period of time;
   a receiver configured to receive the first continuous wave light that is reflected from the object to form a reception signal; and
   a signal processor configured to obtain distance information and speed information about the object based on the reception signal,
   wherein the second continuous wave light is continuously provided to the receiver for a cycle including the first period of time and the second period of time.

2. The LiDAR apparatus of claim 1, wherein the beam steering device is further configured to periodically repeat emitting the first continuous wave light for the first period of time and stopping emitting the first continuous wave light for the second period of time.

3. The LiDAR apparatus of claim 1, wherein the second period of time is greater than the first period of time.

4. The LiDAR apparatus of claim 1, wherein the first period of time is in a range of 1 ns to 1,000 ns.

5. The LiDAR apparatus of claim 1, wherein the receiver is further configured to form the reception signal by combining the first continuous wave light received by the receiver and the second continuous wave light provided from the beam splitter, and causing the first continuous wave light received by the receiver to interfere with the second continuous wave light provided from the beam splitter to the receiver.

6. The LiDAR apparatus of claim 1, further comprising:
   an optical amplifier configured to amplify the first continuous wave light provided from the beam splitter and provide the amplified first continuous wave light to the beam steering device for the first period of time, and stop amplifying and outputting the first continuous wave light for the second period of time.

7. The LiDAR apparatus of claim 1, wherein the beam steering device is further configured to emit the first continuous wave light multiple times toward a first area in front of the beam steering device and then emit the first continuous wave light multiple times toward a second area different from the first area.

8. The LiDAR apparatus of claim 7, wherein the signal processor is further configured to:
   accumulate a plurality of first reception signals received from the first area and obtain distance information and speed information about a first object in the first area based on the accumulated plurality of first reception signals; and
   accumulate a plurality of second reception signals received from the second area and obtain distance information and speed information about a second object in the second area based on the accumulated plurality of second reception signals.

9. The LiDAR apparatus of claim 1, wherein the signal processor is further configured to extract the distance information about the object by analyzing a waveform of the reception signal in a time of flight (ToF) manner.

10. The LiDAR apparatus of claim 1, wherein the signal processor is further configured to extract the speed information about the object by analyzing a frequency of the reception signal in a Doppler manner.

* * * * *